United States Patent Office 3,479,179
Patented Nov. 18, 1969

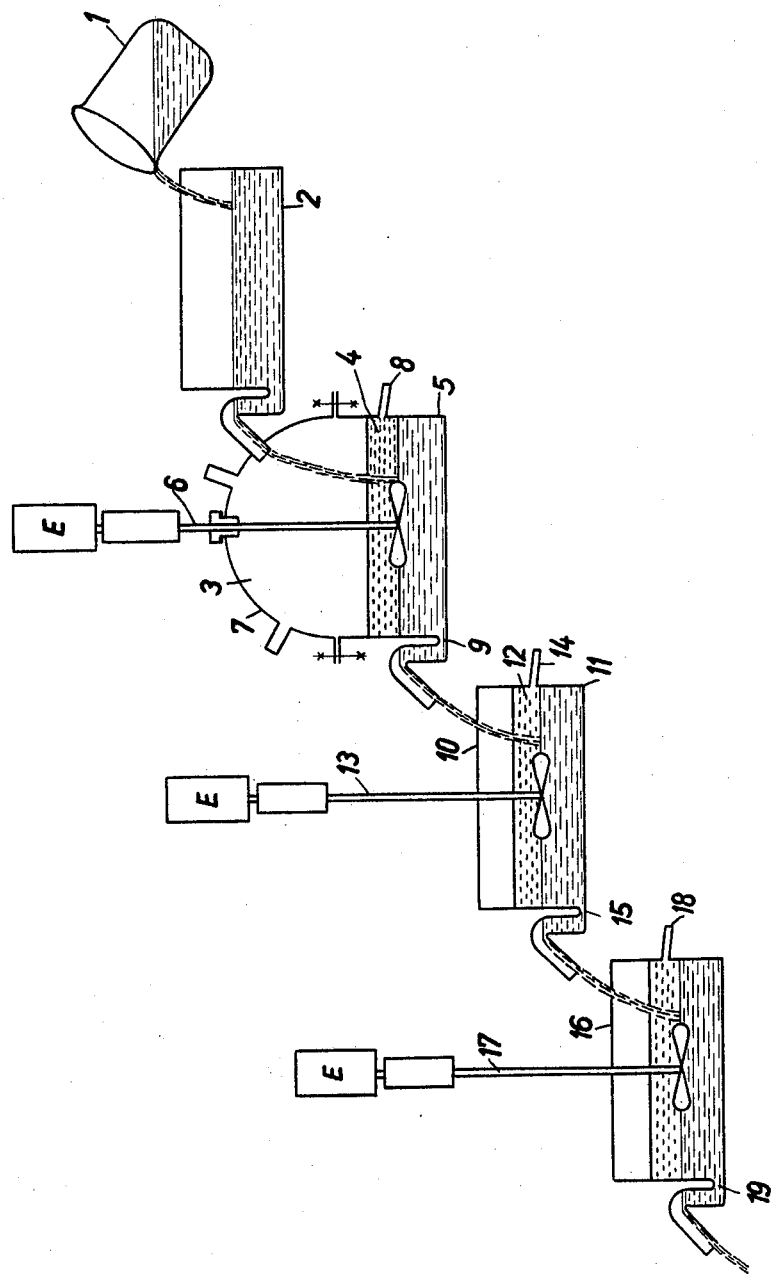

3,479,179
PROCESS FOR THE SELECTIVE CONTINUOUS REFINING OF TIN, ANTIMONY, ZINC, AND ARSENIC IMPURITIES FROM LEAD
Peter Paschen, Schellerweg 80, Stolberg, Germany, and Helmut Winterhager, Gut Steeg 24, Aachen, Germany
Filed July 26, 1966, Ser. No. 567,933
Claims priority, application Germany, July 30, 1965, St 24,208
Int. Cl. C22b 13/06
U.S. Cl. 75—78    14 Claims

ABSTRACT OF THE DISCLOSURE

A process of refining lead for the separation therefrom of impurities in the form of tin and antimony and either zinc or arsenic or both of these metals or oxides thereof, the said process comprising a three-stage operation,
in the first stage the impure molten lead being subjected to the action of caustic alkali at an elevated temperature and upon exclusion of oxygen followed by withdrawal of the formed slag containing the zinc or arsenic compounds formed by the action of said caustic alkali or both of these compounds;
thereafter in the second stage subjecting the molten lead received from the first stage to the action of caustic alkali at an elevated temperature in the presence of oxygen and withdrawing the slag containing the formed tin compound;
and finally in the third stage subjecting the remaining molten lead received from the second stage to the action of caustic alkali in the presence of oxygen at an elevated temperature higher than that used in the second stage and withdrawing the formed slag containing the antimony compounds, the concentration of oxygen in the second and third stage being limited to that amount required for the impurities which it is desired to eliminate in the corresponding stage; and recovering the purified lead.
The invention also embraces an apparatus for carrying out the method comprising three vessels arranged in series and means to pass the lead from one vessel to the other and heating means and stirring means for each vessel and means for withdrawing the slag from each vessel.

The object of the invention is a process and installation for selective and continuous lead refining, in particular for eliminating such elements as are readily oxidized, like zinc, arsenic, tin and antimony.

In industrial practice the reverberatory furnace process or the Harris process are used for extacting metals less noble than lead, like zinc, asenic, tin and antimony.

As to the reverberatory furnace process one may distinguish discontinuous and continuous operation. Both types of operation involve the disadvantage that the products of oxidation ("scums") formed in the process are mixtures containing a high proportion of lead oxide, and lower proportions of the oxides of zinc, arsenic, tin and antimony. For example, a scum from a reverberatory furnace contains

| | Percent |
|---|---|
| Zn | 1 |
| As | 2 |
| Sn | 2 |
| Sb | 20 |
| Pb | 65 |

Although the discontinuous reverberatory furnace process yields a certain preseparation of the metal oxide the disadvantage of the high lead content in the oxide material still remains; beside that, the discontinuous operation involves the shortcoming of low throughput and, with that, high cost.

In the Harris process liquid lead is pumped through a molten mixture of sodium hydroxide, saltpetre and sodium chloride in a special type of equipment. This type of operation is advantageous insofar as the salt slag absorbs the oxides of the contaminating metals, but no lead. However, this method does not yield good separation of the individual metal oxides; is it just possible to separate a low-antimony slag containing arsenic and tin from a high-antimony slag. The discontinuous operation, the addition of saltpetre and sodium chloride, and the tedious regeneration of the slag contribute to increasing the cost of the process.

Experimental work aimed at a continuous version of the Harris process has been reported recently; however, the contaminating constituents are transferred to the salt slag without any selectivity, here too.

The invention described here eliminates the shortcomings mentioned above and simultaneously yields the following advantages, i.e.

(1) Satisfactory separation of the individual metal oxides,
(2) The feasibility of continuous operation,
(3) The elimination of the saltpetre and sodium chloride additions to the sodium hydroxide,
(4) a lead-free oxidation product.

According to this invention these effects are obtained in a process as described above by working in three stages, the first stage involving a treatment with caustic alkali in the absence of oxygen. It is achieved in this way that in the first stage only zinc and arsenic are eliminated by the treatment with caustic alkali, and in particular with sodium hydroxide, while tin and antimony remain practically unattacked. In the second and the third stage respectively tin and antimony are successively extracted by caustic alkali, and in particular sodium hydroxide, tin being extracted at a relatively low temperature, e.g. 420° C., while antimony is extracted at a higher temperature, e.g. 500° C., because in this way even the last traces of antimony are eliminated faster and more completely. In the second and the third stage different oxygen concentrations may be maintained above and/or in the melt, preferentially by stirring; oxygen concentrations are lower during tin extraction than during antimony extraction.

Experimental work has shown that lead refined in this way contains only 0.0005% or less of each zinc, arsenic, tin and antimony, with reference to the lead yield. There is no loss of lead because—as has been found—the slag contains practically no lead. The quantity of metal compounds in the different slags depends from the quantity of these metals originally contained in the lead, and from the rate at which the lead is carried through the individual stages. The refining degree may be varied correspondingly.

It has turned out advantageous to maintain a fully continuous or semicontinuous slag recycling at each stage for regenerating the caustic alkali and for recuperating the metal compounds from the alkaline slags; in such a cycle the metal oxides can be separated from the slags.

An installation suitable for the utilization of the invention is shown as an example and schematically in the enclosed drawing. According to this drawing the lead containing zinc, arsenic, tin and antimony is first transferred from the container 1 to a fore-hearth 2 in which the temperature is maintained at e.g. 420° C. From the fore-hearth 2 the lead flows into a kettle 3 holding the sodium hydroxide melt 4 beneath which the molten lead 5 is collected. A stirrer 6 produces an intimate mixture of the molten sodium hydroxide and the liquid lead, the zinc in the lead being converted to sodium zincate, the arsenic to sodium arseniate. Since access of oxygen to this kettle is to be prevented, the kettle is covered by a hood 7 into which protective gas can be introduced for preventing the oxidation of tin and antimony. In the kettle 3 the temperature is maintained at e.g. 420° C. 8 indicates a slag drain for withdrawing the slag which contains zinc and arsenic in the form of their compounds.

The lead, now exempt from zinc and arsenic, leaves the kettle 3 through a siphon 9 which prevents the sodium hydroxide melt from flowing into the next kettle, while the lead can be withdrawn without difficulty. The lead flows into the kettle 10 where the sodium hydroxide melt 12 covers again the molten lead 11. The stirrer 13 is used for mixing lead and sodium hydroxide. In this kettle, too, the temperature is maintained at e.g. 420° C. Since kettle 10 is an open vessel sufficient oxygen for oxidizing tin is thus given access to the alkali and the lead being mixed. If it is deemed necessary kettle 10 may be covered with a hood, too. Gas may then be fed to the hood for adjusting the oxygen partial pressure to such a level as to make sure that only tin, not, however, antimony is oxidized. Oxygen containing gases may be supplied also to the melt if desired. 14 is a slag drain. The lead, now tin-free flows through the siphon 15 to the kettle 16 which is equipped with a stirrer 17, a slag drain 18 and—eventually—a hood. In this kettle the temperature is maintained at e.g. 500° C. and by mixing the alkali and the lead melt antimony is extracted from the lead. Oxygen-containing gas can be supplied to the melt if desired. The lead, now also antimony-free, leaves the kettle 16 through the siphon 19 and is then taken to further processing.

It can further be seen from the drawing that the kettles 3, 10 and 16 are arranged in cascade form thus eliminating the need of pumps. It is practical to make the kettles of steel plate.

Examples of application (1) The first step in lead refining is decopperization after which the lead may contain e.g.

| | Percent |
|---|---|
| As | 0.22 |
| Sn | 0.31 |
| Sb | 0.30 |

Lead of this type was processed according to the present invention, conditions as described being applied to maintain 420° C. in the kettles 3 and 10, and 500° C. in kettle 16. Kettles 3, 10 and 16 each were covered with a hood, the oxygen of the air in kettle 3 was displaced by purging with an inert gas (argon), while an oxygen concentration of 16% was maintained in kettle 10 and a concentration of 26% in kettle 16. At the outlet of each kettle samples were taken during the whole refining process. The analyses were as follows:

| | As, percent | Sn, percent | Sb, percent |
|---|---|---|---|
| Outlet kettle (3) | 0.0048 | 0.29 | 0.28 |
| Outlet kettle (10) | 0.0009 | 0.0096 | 0.24 |
| Outlet kettle (16) | 0.0005 | 0.0004 | 0.0005 |

The degrees of extraction—based on the original quantities—were thus as follows:

| | As, percent | Sn, percent | Sb, percent |
|---|---|---|---|
| In kettle (3) | 97.9 | 6.4 | 6.7 |
| In kettle (10) | 1.7 | 90.5 | 13.3 |
| In kettle (16) | 0.2 | 3.0 | 79.8 |

Based on the original composition the residual contaminant quantities in the lead were as follows:

| | Percent |
|---|---|
| As | 0.2 |
| Sn | 0.1 |
| Sb | 0.2 |

(2) In conventional lead refining desilvering according to Parkes is followed by zinc elimination which is generally achieved by vacuum distillation. The residual contaminant level in the lead is still high enough to require further refining; such residual quantities are e.g.

| | Percent |
|---|---|
| Zn | 0.01 |
| Sb | 0.1 |
| Sn | 0.001 |
| As | 0.0001 |

Such a type of lead was processed according to the invention described. The analyses showed the following impurity levels:

| | Zn, percent | Sn, percent | Sb, percent |
|---|---|---|---|
| Outlet kettle (3) | 0.0002 | 0.001 | 0.09 |
| Outlet kettle (10) | 0.0001 | 0.0002 | 0.08 |
| Outlet kettle (16) | 0.0001 | 0.0002 | 0.0005 |

The degrees of extraction—based on the original quantities—were thus as follows:

| | Zn, percent | Sn, percent | Sb, percent |
|---|---|---|---|
| In kettle (3) | 98 | 0 | 10 |
| In kettle (10) | 1 | 80 | 10 |
| In kettle (16) | 0 | 0 | 79.5 |

Based on the original composition the residual contaminant quantities in the lead were as follows:

| | Percent |
|---|---|
| Zn | 1 |
| Sn | 20 |
| Sb | 0.5 |

This means that 98% of the original Zn and about 80% of each Sn and Sb were eliminated in the slags.

We claim:

1. A process of refining lead for the separation therefrom of impurities in the form of tin and antimony and either zinc or arsenic or both of these metals or the oxides thereof, the said process comprising a three-stage operation, in the first stage the impure molten lead being subjected to the action of caustic alkali at an elevated temperature and in the absence of oxygen and withdrawing the formed slag containing the zinc and/or arsenic compounds formed by the action of said caustic alkali;

thereafter in the second stage subjecting the molten lead received from the first stage to the action of caustic alkali at an elevated temperature in the presence of oxygen and withdrawing the slag containing the formed tin compound formed by action of said caustic alkali;

and finally in the third stage subjecting the remaining molten lead received from the second stage to the action of caustic alkali in the presence of oxygen at an elevated temperature substantially higher than that used in the second stage and withdrawing the formed slag containing the antimony compounds formed by the action of said caustic alkali, the concentration of oxygen in the second and third stages being limited to that required to be eliminated in the corresponding stage;

and recovering the purified lead.

2. The process of claim 1, wherein the caustic alkali is sodium hydroxide.

3. The process of claim 1, wherein the temperature in the second stage is about 420° C. and in the third stage is about 500° C.

4. The process of claim 1, wherein the concentration of oxygen in the third stage is higher than in the second stage.

5. The process of claim 1, wherein oxygen is introduced by oxygen-containing gases.

6. The process of claim 1, wherein oxygen is present in the melt in the second and third stage.

7. The process of claim 1, wherein oxygen is present above the melt in the second and third stage.

8. The process of claim 1, wherein oxygen is present in and above the melt in the second and third stage.

9. The process of claim 1, wherein the total remaining impurities in the purified lead amount to 0.0005 or less of each of the metal impurities present in the initial lead.

10. The process of claim 1, wherein there are present as impurities in the initial lead arsenic, tin and antimony, the elimination of arsenic in the first stage amounting to 97.9% relative to the initial composition and wherein the elimination of tin in the second stage amounts to 90.5% and wherein the elimination of the antimony in the third stage amounts to 79.8%.

11. The process of claim 1, wherein the impurities eliminated are about as follows, the initial impurities being arsenic, tin and antimony oxides:

|  | As, percent | Sn, percent | Sb, percent |
|---|---|---|---|
| First stage | 97.9 | 6.4 | 6.7 |
| Second Stage | 1.7 | 90.5 | 13.3 |
| Third Stage | 0.2 | 3.0 | 79.8 |

12. The process of claim 1, wherein the initial impurities comprise zinc, tin and antimony and wherein in the first stage about 98% of the zinc is removed and wherein in the second stage about 80% of the tin is removed and wherein in the first and second stages about 10% of the antimony and in the third stage about 79.5% of the antimony are removed and wherein the residual impurities in the final lead are about 1% zinc, 20% tin and 0.5% antimony relative to the amounts present in the initial composition.

13. The process of claim 1, wherein the slag obtained in at least one stage is recycled after separation therefrom of the individual impurities present therein.

14. The process of claim 1, which is carried out in a substantially continuous manner.

References Cited
UNITED STATES PATENTS

| | | | |
|---|---|---|---|
| 1,006,323 | 10/1911 | Wemple | 75—78 |
| 1,106,480 | 8/1914 | Thum | 75—79 X |
| 1,523,980 | 1/1925 | Colcord | 75—78 |
| 1,573,830 | 2/1926 | Harris | 75—78 |
| 1,583,495 | 5/1926 | Schleicher | 75—78 |
| 1,740,752 | 12/1929 | Thompson | 75—78 |
| 1,976,333 | 10/1934 | Dittmer | 75—78 |
| 2,241,806 | 5/1941 | Burkey | 75—78 |
| 2,335,758 | 11/1943 | Heberlein | 75—78 |

L. DEWAYNE RUTLEDGE, Primary Examiner

H. W. TARRING II, Assistant Examiner